May 1, 1962 G. M. NELSON 3,031,833
BEET TOPPING MACHINE
Filed Feb. 4, 1960 2 Sheets-Sheet 2
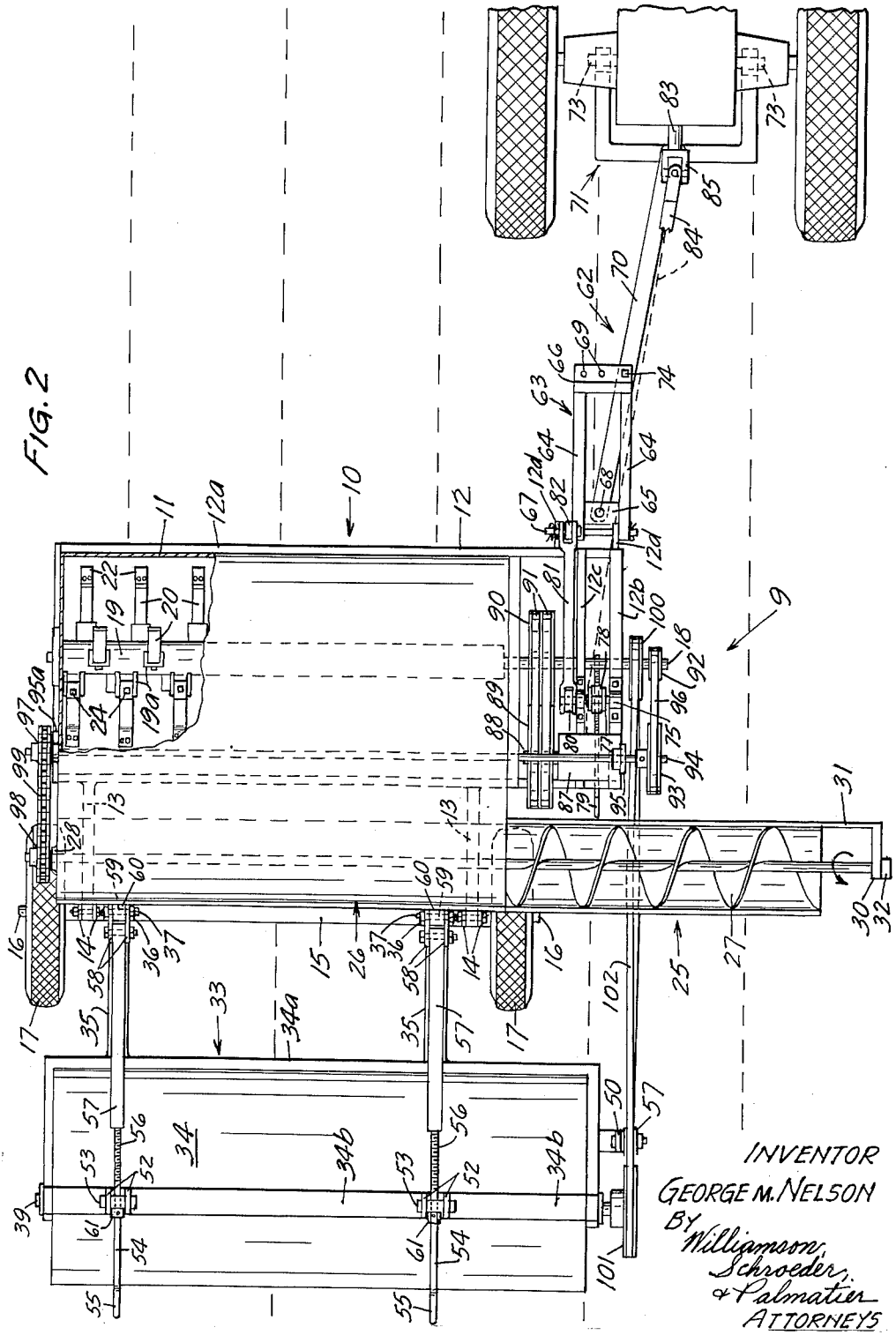
INVENTOR
GEORGE M. NELSON
BY Williamson,
Schroeder,
& Palmatier
ATTORNEYS United States Patent Office 3,031,833
Patented May 1, 1962

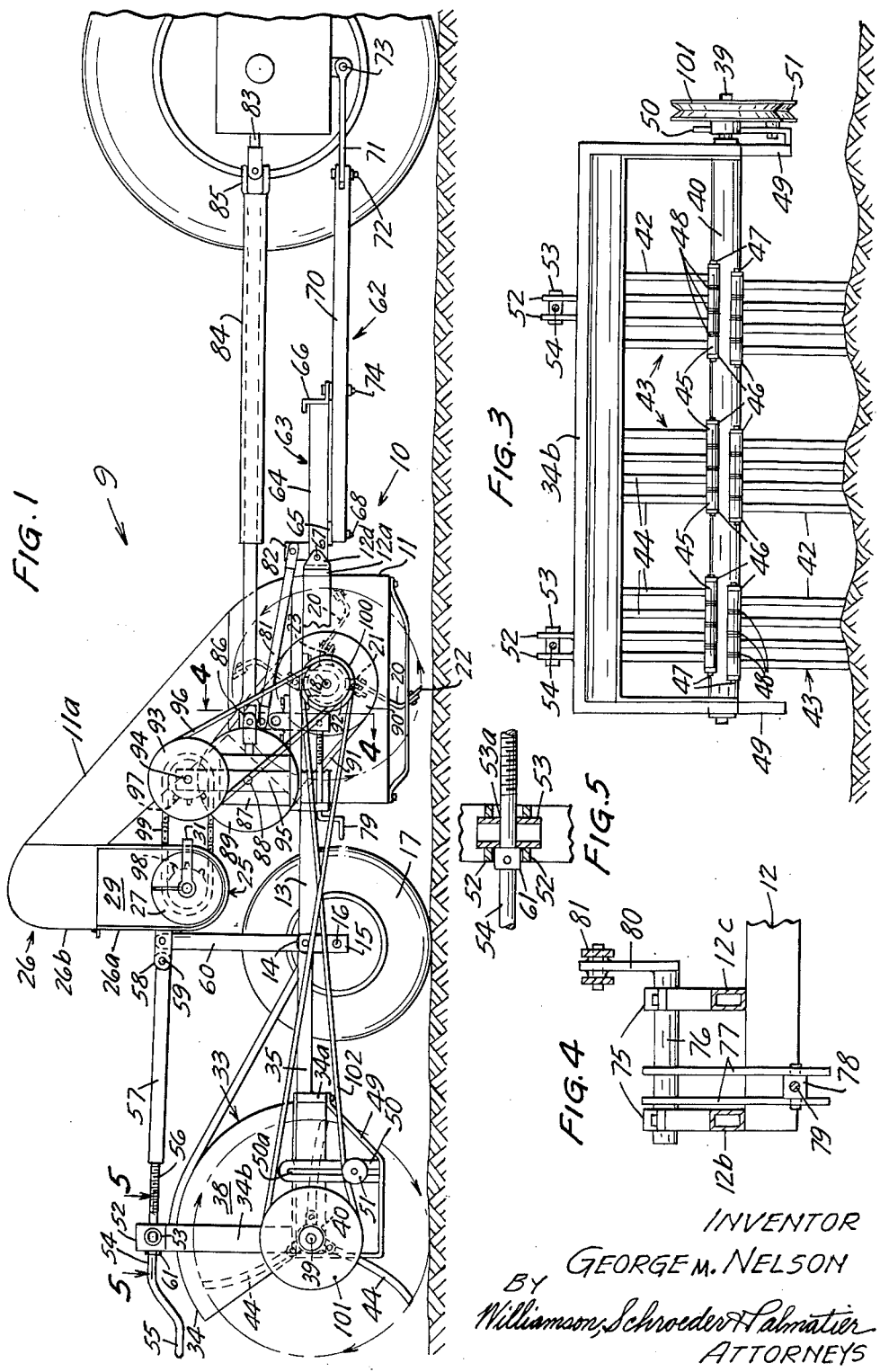

3,031,833
BEET TOPPING MACHINE
George M. Nelson, Fairfax, Minn.
Filed Feb. 4, 1960, Ser. No. 6,775
7 Claims. (Cl. 56—238)

This invention relates to machines for removing tops from beets and the like and more particularly to machines which sequentially cut and thereafter trim the tops from beets and the like.

One of the long existing problems associated with beet harvesting is the inability of most conventional machines to cleanly remove the top from the beet without dislodging the beet from the soil or without causing damage to the beet. Because of the variances in the sizes of beets, the unevenness of the terrain and the mechanism used for removing the tops of beets, it is extremely difficult to remove the tops from the beets without removing a substantial portion of the crown of the beet which results in a substantial loss or without dislodging or otherwise damaging the beets.

Another problem associated with beet harvesting is that most conventional topping machines make no provision for removing the cut tops away from the rows to be harvested so that when these rows are harvested a great amount of green material accumulates with the beets as they are lifted from the ground and, of course, interferes with the harvesting operation. This is true whether the beet topping machine is separately operated or is a part of a beet harvesting machine. When the beets are harvested, they are usually placed in piles to await further processing and in the event the beets are not cleanly topped or if there is a great deal of leaves or green material left on the ground, this green material will be intermixed in the pile of beets which will break down quickly and often times cause spoilage of the beets.

Various mechanisms have been employed for removing the tops from beets including cutter elements, flexible flails and rotary blades and the like but these devices either fail to remove enough of the green material or remove a portion of the crown of the beet. The flexible type topping element, for example, must be rotated at great peripheral speeds in order to remove the tops from the beets effectively and this results quite often in the beets themselves being damaged. On the other hand, rotary cutter blade type devices will invariably shear off too much of the beets or fail to remove enough of the top because of the inability of the machines to readily adjust to varying sizes of the beets and the unevenness of the terrain. This invention is directed towards overcoming these problems.

It is the general object of this invention to provide a novel and improved beet topping machine of simple and inexpensive construction, for readily and efficiently removing tops from beets and the like.

Another object of this invention is to provide a novel beet topping machine arranged and constructed to effectively remove the tops from beets and the like regardless of the variances in the size of the beets or the unevenness of the terrain.

A more specific object of this invention is to provide a novel beet topping machine arranged and constructed to first cut the major portion of the tops from the beets and thereafter trim the remaining top portions from the beets in a manner to minimize damage to the beets.

A further object of this invention is to provide a novel beet topping machine including means arranged and constructed to first cut the major portion from the tops of the beets and to convey said cut tops laterally outwardly of the machine and to thereafter trim the remaining tops from the beets whereby the tops from a plurality of rows of beets are simultaneously cut and removed from these rows to thereby facilitate harvesting of the beets.

These and other objects and advantages of this invention will more fully appear from the following description, made in connection with the accompanying drawings, wherein like reference characters refer to the same or similar parts throughout the several views, and in which:

FIG. 1 is a side elevational view of my novel beet topping machine with parts thereof broken away for clarity;

FIG. 2 is a top plan view of my novel beet topping machine with portions thereof broken away;

FIG. 3 is an enlarged rear elevational view of the trimming mechanism;

FIG. 4 is a transverse section taken on line 4—4 of FIG. 1 and looking in the direction of the arrows; and FIG. 5 is an enlarged sectional view taken on line 5—5 of FIG. 1.

Referring now to the drawings, it will be seen that one embodiment of my novel beet-topping machine generally designated 9, is shown connected to a tractor T for movement in a predetermined direction for traversing a plurality of rows of beets to be topped. Referring now to FIG. 1, it will be seen that my novel beet topping machine includes a cutting mechanism designated in its entirety by the reference numeral 10 and which includes a housing 11. Housing 11 has an open bottom and is provided with a rectangularly shaped reinforcing frame 12 as best seen in FIG. 2. Frame 12 is comprised of front and rear transverse legs 12a and end legs 12b with the front and rear legs being fixedly secured to the respective front and rear wall portions of housing 11. It will be noted that only one of the end legs 12b is affixed to the end of housing 11 while the other is spaced therefrom to provide a support medium for the drive means to be later described.

A pair of arms 13 each have an end affixed to the rear leg of rectangular frame 12 and these arms extend rearwardly therefrom. Each of these arms 13 has its other end pivotally mounted between a pair of ears 14 which are affixed to and extend upwardly from axle housing 15. Axle housing 15 has an axle 16 disposed therein with ground engaging wheels 17 mounted at the outer ends thereof.

It will be seen that cutting mechanism 10 also includes an elongate shaft 18 having its ends journalled for rotation in the ends of the cutting mechanism housing 11 and a sleeve 19 is positioned around and affixed to shaft 18 for rotation therewith. A plurality of cutting elements 20 are arranged along the entire length of sleeve 19 and are staggered circumferentially, as best seen in FIG. 2. These cutting elements are formed of rigid metallic material and each has one end 21 thereof acutely bent into U-shaped configuration while the other end is oppositely bent and is provided with a replaceable cutting tip 22 which is secured thereto by bolts or the like. Sleeve 19 is provided with a plurality of circumferentially arranged, channel-shaped attachment elements 19a along its entire length and the U-shaped end 21 of each of the cutting elements 20 is positioned within one of these channel-shaped attachment elements 19a and pivotally connected thereto by a pivot pin 23. A retaining pin or bolt 24 extends between the legs of the U-shaped ends 21 of each of the cutting elements and maintains the pivotal connection between cutting element 20 and the channel-shaped attachment elements 19a.

A hollow chute 11a as best seen in FIG. 1 extends upwardly and rearwardly from the top portion of cutting mechanism housing 11 and opens at its upper end into a conveyor housing 26 of a conveyor mechanism 25. Conveyor housing 26 as seen in FIGS. 1 and 2 is comprised of and elongate channel-shaped bottom portion 26a and an elongate channel-shaped top portion 26b which are secured together along their longitudinal edges. It will be noted, however, from FIG. 2 that the channel-shaped bottom portion 26a is much longer than its associated top portion 26b and extends laterally outwardly beyond the confines of the beet topping machine a substantial distance. An auger type conveyor 27 is housed within housing 26 and has one end thereof rotatably journalled in bearing 28 which is secured to end wall 29 of housing 26. The other end of auger conveyor 27 is rotatably journalled in a bearing 30 which is carried by an L-shaped bracket 31. This end of auger conveyor 27 is also provided with a retaining element 32 to prevent longitudinal movement of the auger conveyor in its respective bearings. It will also be noted that auger conveyor 27 has a length substantially equal to the length of the bottom channel portion 26a of conveyor housing 26.

My novel beet topping machine also includes a trimming mechanism 33 which, as seen in FIGS. 1 and 2, is positioned rearwardly of the cutting mechanism 10 and the conveyor mechanism 25. This trimming mechanism 33 includes a trimming mechanism housing 34 formed of suitable metallic material and provided with a horizontally disposed U-shaped reinforcing frame 34a and a vertically disposed inverted U-shaped reinforcing frame 34b. A pair of arms 35 have their rearmost ends rigidly secured as by welding to the U-shaped reinforcing frame 34a at laterally spaced points therealong and these arms 35 have their respective forward ends pivotally secured between spaced pairs of ears 36 by pivot pins 37 as best seen in FIG. 1. The pairs of ears 36 are affixed to axle housing 15 at longitudinally spaced points by welding or the like. Thus it will be seen that cutting mechanism 10 and trimming mechanism 33 are interconnected to the axle housing 15 for pivoting about horizontal axes extending transversely of beet topping machine 9.

Trimming mechanism 33 also includes an elongate shaft 39 having its respective ends journalled for rotation in suitable bearings formed in end walls 38 of housing 34. An elongate sleeve 40 is positioned around shaft 39 and is keyed thereto for rotation therewith. It will be noted that the axis of rotation of shaft 39 is transversely of the direction of travel of the beet topping machine 10.

Referring now to FIG. 3, it will be seen that sleeve 40 also includes a plurality of trimming elements 42 arranged in groups 43 which are longitudinally spaced along the sleeve 40. The spacing between these groups corresponds to the spacing between the rows of beets and it will also be noted that these groups are each comprised of a plurality of circumferentially arranged sets of trimming elements. The trimming elements 42 of each set are each comprised of an elongate shank portion 44 having a tubular head 45 integrally formed at one end thereof. A plurality of these trimming elements 42 are pivotally secured between a pair of aligned ears 46 by a pivot bolt 47 with spacer means 48 positioned between adjacent of these trimming elements 42. It will be noted that each set of trimming elements of each group is longitudinally offset relative to the other sets of its group. This staggered relation allows each group to effectively clean or trim a zone slightly wider than the rows to be topped, the rows being approximately 22 inches apart. It will be noted that in the embodiment shown I have provided four of these trimming elements 42 to each set and include three sets to each group 43, there being three groups. With this arrangement, I can simultaneously top and trim the tops from three rows of beets and convey the cut tops laterally away from the rows to be harvested. These trimming elements 42 are preferably formed of yieldable flexible material such as rubber or the like and are adapted to flex upon contact with the ground or the upper surface of a sugar beet.

Trimming mechanism 33 may also be provided with a pair of shoes 49 which are secured to and depend from horizontally disposed U-shaped reinforcing frame member 34a. A vertically extending bracket 50 having a slot 50a formed therein is secured to one of the shoes 49 for supporting a tightener pulley 51 thereto, the function of which will be described hereinafter. This tightener pulley may be adjusted vertically while shoes 49 provide means for supporting trimming mechanism 33 when my beet topping machine 9 is detached from a tractor.

Means are also provided for permitting trimming mechanism 33 to be vertically adjusted so that trimming elements 42 may be correctly positioned with respect to the surface of the ground and the rows of beets which are to be trimmed. Referring now to FIG. 2, it will be seen that the upper surface of the trimming mechanism housing 34 has two pairs of ears 52 extending upwardly therefrom, each pair being laterally spaced with respect to the other. Each pair of ears 52 has aligned apertures formed therein which receive the ends of a short shaft 53 and this shaft has a diametrically extending opening 53a formed therein through which extends an elongate crank member 54. The opening 53a through each of the small shafts 53 is somewhat larger than the diameter of its associated crank member 54 to thereby permit free relative sliding between the shaft 53 and crank member 54. Each of the crank members 54 is provided with a hand crank portion 55 at one end thereof and the other end is threaded as at 56 and this threaded end is threadedly received within a tubular member 57. Each of the tubular members 57 has its front end pivotally secured between a pair of ears 58 by a pivot pin 59 and these ears 58 are secured to the rear portion of conveyor housing 26 as by welding or the like. Vertically extending reinforcing braces or bars 60 may be provided, each having its upper end portion positioned between and secured to a pair of ears 58 and each having its lower end secured to the upper surface of axle housing 15. Each of the crank members 54 is also provided with an annular member 61 which is welded thereto adjacent the hand crank portion 55. Each of the crank members 54 has a sleeve 61a disposed therearound with one end of each sleeve abutting against the annular member 60 and the other end thereof engaging the shaft 53. Thus it will be seen that the effective height or distance the sleeve 40 and trimming elements 42 of trimming mechanism 33 may be adjusted relative to the surface of the ground. The trimming mechanism may be raised by rotating each of the crank members 54 therefore causing its associated sleeve member 61a to urge shaft 53 and housing 34 forwardly. If the crank member 34 is rotated in a direction to lower the housing, the weight of the trimming mechanism itself will cause the mechanism to be lowered. It will also be noted that in the event my beet topping machine 10 strikes a bump or the like, the housing is free to shift upwardly and forwardly with respect to the crank member 54. This is possible because of the pivotal connection between the arms 35 and the variance in size of the diameter fo the crank member 54 and the opening 53a through shaft 53.

Hitch means are also provided and include a hitch mechanism designated in its entirety by the reference numeral 62. This hitch mechanism 62 includes a frame member 63 formed of a pair of spaced elongate channel members 64 secured at their rear end by a plate 65 and at the front portion by a Z-bar 66. A pair of laterally spaced ears 12d are welded to frame member 12 adjacent one side thereof and the rear portions of channel members 64 are positioned between and pivotally secured to these ears 12d by pivot pins 67.

Referring now to FIG. 1, it will be seen that plate 65 of frame member 63 is provided with a depending stud 68 which is integrally formed with plate 65. The Z-bar 66, as best shown in FIG. 2, is provided with a plurality of laterally spaced openings 69 the function of which will be described hereinbelow. An elongate draw bar has one end pivotally secured to stud 68 and has the other end thereof pivotally secured to a tractor hitch 71. The tractor hitch 71 is of conventional construction and the draw bar 70 is pivotally connected as at 72 thereto and the hitch 71 is pivotally connected to the tractor as at 73 for swinging movement about a transverse substantially horizontal axis. Draw bar 70 is also provided with an opening intermediate its end which is positioned closely adjacent the opening 69 formed in Z-bar and a stud or pin 74 secures the intermediate portion of the draw bar to Z-bar 66 and it will be seen that the line of draft of the tractor and implement may be variously adjusted. It should be pointed out, however, that it is preferred that in the beet topping operation to have the draw bar positioned in the manner shown in FIG. 2 so that the implement is offset laterally of the tractor.

Means are also provided for adjusting the height of cutter mechanism 11 with respect to the surface of the ground. It should be pointed out that the cutter mechanism 11 should be so positioned that the cutter elements 21 are disposed above the surface of the ground. Referring now to FIG. 4 it will be seen that reinforcing frame 12 is provided with an intermediate leg element 12c positioned closely adjacent the end leg 12b which is closest the hitch side of the implement. This end leg 12b and leg 12c are each provided with bearing member 75 positioned thereupon. A shaft 76 has its ends journalled within the bearings 75 and a pair of elongate, laterally-spaced, arms 77 are affixed to shaft 76 and depend therefrom. A nut member 78 having a threaded bore is suitably trunnioned between the lower ends of arms 77. An elongate threaded crank shaft 79 threadedly engages the threaded bore of nut member 78 and is suitably supported adjacent its rear end for rotative movement.

An upstanding arm 80 is affixed to one end of shaft 76 for rotation therewith and has its upper end pivotally connected to the rear bifurcated end of a link 81. The front end of link 81 is also bifurcated and is pivotally connected to an upstanding lug 82 rigidly connected to frame 63. It will be seen that by rotating crank shaft 79 in a direction to cause link 81 to move in a rearward direction, the pivot axis defined by pivot pin 67 will be moved upwardly, thus causing the cutter mechanism to pivot about the pivotal connection between arms 13 and axle housing 15. This will cause the cutter mechanism to be elevated. The position shown in FIG. 1 is approximately the lowermost adjusted position for operation.

Tractor T is provided with a conventional power take-off 83 which is connected to the drive shaft 84 of the implement 9 by means of a universal joint 85. Another universal joint 86 is provided for connecting shaft 84 with a small input shaft of a gear box 87. Gear box 87 is in turn provided with an output shaft 88 to which is keyed a pulley 89 for rotation therewith. Gear box 87 is of the conventional speed reduction type and a detailed explanation thereof is deemed unnecessary for the purposes of this invention.

Referring now to FIG. 2, it will be seen that shaft 18 of cutting mechanism 10 has a pulley 90 affixed thereto adjacent but spaced from one end thereof. A belt 91 is positioned around pulleys 89 and 90 to provide a driving connection therebetween and for rotating cutting mechanism 10 at speeds approximating 1750 r.p.m.'s.

Again referring to FIG. 2, it will be seen that one end of shaft 18 adjacent pulley 89 has another pulley 92 keyed thereto. A pulley 93 is affixed to a shaft 94 which extends transversely of the beet topping machine 9 and which is supported at one end by an arm 95 having suitable bearing means. Shaft 94 is supported at its other end by a small arm 95a affixed to the side of chute 11a and which is provided with a suitable bearing. A belt 96 is trained over pulleys 92 and 93 to provide a driving connection therebetween. It will be noted that pulley 93 is substantially larger than pulley 92 to thereby effect a substantial speed reduction between pulley shaft 94 and shaft 18. A sprocket 97 is affixed to the opposite end of shaft 94 and a sprocket 98 is affixed to the corresponding end of auger conveyor 27. A conventional chain 99 is entrained over sprocket 97 and 98 for providing a drive means for the auger conveyor 27.

Shaft 18 is also provided with a pulley 100 affixed thereto and which is positioned between pulley 89 and pulley 92. Another pulley 101 is affixed to shaft 39 of trimming mechanism 33 and a belt 102 is trained over pulleys 100 and 101 for effecting a driving connection therebetween. It will be noted that belt 102 is twisted so that shaft 39 is driven in a direction oppositely of the direction of rotation of shaft 18. It will also be noted that pulley 100 is somewhat larger than pulley 101 so that the speed with which the shaft 39 is rotated is substantially less than the speed which shaft 18 is rotated. Actually the shaft 39 is rotated at approximately half the speed which shaft 18 is rotated and this particular speed differential being desirable to avoid injury to the beets when the trimming elements 42 strike the plants.

*Operation*

Prior to the traversing of the rows by the machine, the cutting mechanism 10 and the trimming mechanism 33 are adjusted to the desired predetermined position above the surface of the ground. It is pointed out above, the cutting mechanism 10 should be so positioned that the cutting tip 22 of each of the cutting elements 20 is disposed a substantial distance above the surface of the ground and above the crown of the beet to be topped. By so positioning the cutter elements 20, only the upper portions of the appendages or tops of the beets will be sheared or cut by the action of the cutting elements therefore avoiding any danger of actually cutting or shearing off the crown of the beet. It should be pointed out that the cutter mechanism will be rotated at approximately 1750 r.p.m.'s and if the cutting element struck the beet at these speeds, the beet would obviously be damaged.

The trimming mechanism 33 is positioned so that the flexible trimming elements or flails 42 will strike the ground and, of course, strike the crown portions of the beets. It has been found that by rotating the trimming mechanism 33 at relatively slow speeds and because of the flexible yieldable construction of the flexible elements 42, a small portion of the tops on beets can be effectively removed without damaging or actually dislodging the beets. The trimming mechanism will accordingly be rotated at approximately 800 r.p.m.'s which is approximately half the rotative speed of the cutting mechanism.

When the beet topping operation begins, the beet topping machine 9 is towed by the tractor T as indicated in FIG. 2 of the drawing to traverse the first three rows of the field to be harvested. Ordinarily the harvester will follow the topping machine and will travel in the same direction as the beet topping machine. It will be noted that the beet topping machine 9 is offset laterally of the tractor so that the drive wheels of the tractor do not damage the rows of the beets to be harvested. As the beet topping machine 9 traverse the rows of beets as indicated in FIGS. 1 and 2 of the drawing, the cutter elements 20 will strike and shear the uppermost portions of the beet tops from a plurality of rows and will impel these cut upper portions of the tops through the hollow chute 11a. The rotation of the cutting elements 20 is of sufficient speed to impel these cut tops in an upward and rearward direction into the conveyor housing 26 and these cut tops will thereafter be conveyed laterally outwardly away from the rows to be harvested. It should also be pointed out that the rotation of cutter mechanism 10 is at a sufficient speed to cause a current of air to flow rapidly through chute 11a which prevents clogging of the so cut top portions at the opening between the chute 11a and the auger conveyor housing 26. The direction of rotation of cutter mechanism 10 is indicated by an arrow in FIG. 1 and it will be noted that the underpassing arc of rotation of the cutter elements is in the direction of travel which tends to not only shear the upper portions of the beet tops but also to lift and hurl these cut top portions in an upward and rearward direction through the chute 11a.

As the machine traverses further along, the rotation of trimming mechanism 33, which rotation is in a direction oppositely of the direction of rotation of the cutter mechanism, causes the flexible trimming elements or flails 42 to strike the crown portion of the beet and the remaining portion of the top or appendage will be removed. These flexible elements or flails 42 will flex upon contact with the beet crowns and the relatively slow rotative speed of the trimming mechanism 33 minimizes damage to the beets and insures cleaning or trimming of the remaining green portions from the beets. This remaining green portion will be impelled rearwardly and slightly laterally to fall in the troughs between the rows. It will be noted that as the harvester traverses the rows that have been topped, the beets will be completely free of green material, the cut upper portions or major portion of the green appendages having been conveyed laterally away from these rows thus leaving very little debris to interfere with the harvesting operation and the beets themselves will not be dislodged or have their crown removed.

Thus it will be seen that I have provided a novel beet topping machine which is arranged and constructed to sequentially cut and thereafter trim the top portions from beets and the like in a manner to minimize if not preclude damage to the beets. It will also be noted that my novel beet-topping machine is so arranged and constructed that the major portion of the appendages or tops which are removed from the beets are conveyed laterally away from the rows being topped to thereby facilitate harvesting of the beets and to thereby avoid spoilage of the beets while awaiting further processing. It will therefore be seen that my novel beet topping machine results not only in an increased yield by reducing or minimizing damage to the beets during the beet topping operation, but also effects a saving in time, labor and subsequent loss of beets by rendering the field to be harvested almost completely free of the cut tops.

It will, of course, be understood that various changes may be made in the form, details, arrangement and proportions of the parts without departing from the scope of this invention which consists of the matter shown and described herein and set forth in the appended claims.

What is claimed is:

1. A beet and the like topper comprising a mobile frame, a rotary cutter extending transversely of said frame and having cutters thereon spaced from the ground a distance at least as great as the maximum height of beets and the like being topped, and a rotary trimming device extending transversely of said frame and to the rear of said cutter, said trimming device having flexible trimming elements thereon which extend at least to the ground level whereby the beet stalks are cut off and then the remaining leaves are removed from the beets.

2. The structure as defined in claim 1 and a conveyor mechanism mounted transversely of said mobile frame and extending laterally outwardly from one side thereof, said conveyor mechanism being positioned above and rearwardly of said rotary cutter and receiving the cut beet stalks from the rotary cutter mechanism for conveying the same laterally outwardly of the frame.

3. The structure as defined in claim 1 wherein said rotary cutter and said rotary trimming device are rotated in opposite directions and the underpassing arc of rotation of said rotary cutter is in the direction of travel of said machine.

4. The structure as defined in claim 1 wherein said rotary cutter includes an elongate rotary shaft having a plurality of rigid blades pivotally connected thereto.

5. The structure as defined in claim 1 and means for selectively adjusting the height of said trimming device relative to the surface of the ground.

6. The structure as defined in claim 1 wherein said rotary cutter is rotated at approximately twice the speed of said rotary trimming device.

7. The structure defined in claim 2 wherein said conveyor mechanism includes an auger conveyor element.

References Cited in the file of this patent

UNITED STATES PATENTS

| | | |
|---|---|---|
| 2,608,816 | Lembke | Sept. 2, 1952 |
| 2,795,913 | Skromme et al. | June 18, 1957 |